United States Patent [19]

Leigh-Monstevens et al.

[11] Patent Number: 4,785,721
[45] Date of Patent: Nov. 22, 1988

[54] HYDRAULIC CYLINDER ANNULAR INSERT FOR RETAINER MEMBER

[76] Inventors: Keith V. Leigh-Monstevens, 5622 Larkins Dr., Troy, Mich. 48098; David K. Mienko, 108 S. Custer, Clawson, Mich. 48017

[21] Appl. No.: 885,672

[22] Filed: Jul. 15, 1986

[51] Int. Cl.$^4$ .............................................. F16J 10/00
[52] U.S. Cl. ........................................ 92/171; 92/169; 60/588
[58] Field of Search ............... 92/170, 171, 168, 13.6, 92/59, 128, 169, 169.2, 169.3, 169.4, 130 R; 60/533, 585, 588, 594

[56] References Cited

U.S. PATENT DOCUMENTS

| | | | |
|---|---|---|---|
| 3,013,393 | 12/1961 | Erickson | 60/588 |
| 3,918,351 | 11/1975 | Finke | 92/169 X |
| 4,085,661 | 4/1978 | Schriever | 92/168 |
| 4,162,616 | 7/1979 | Hayashida | 92/171 |
| 4,211,151 | 7/1980 | Wallischeck | 92/168 |
| 4,373,599 | 2/1983 | Walter | 92/168 |
| 4,414,881 | 11/1983 | Devaud | 92/128 X |
| 4,495,772 | 1/1985 | Furuta | 92/171 |
| 4,505,112 | 3/1985 | Nakamura | 60/533 |
| 4,510,752 | 4/1985 | Gaiser | 92/170 |
| 4,527,395 | 7/1985 | Gaiser | 92/170 |
| 4,577,549 | 3/1986 | Frank et al. | 92/169 |
| 4,685,298 | 8/1987 | Bacardit | 92/168 |

Primary Examiner—Edward K. Look
Attorney, Agent, or Firm—Krass & Young

[57] ABSTRACT

An annular insert disposed at one end of a hydraulic cylinder and embedded in the material of the cylinder housing during molding of the housing. The insert has an internal groove in which a conventional retainer and abutment member in the form of an elastic spring steel split ring is engaged, whose function it is to act as a direct abutment preventing the piston disposed reciprocably in the cylinder from being pushed out of the open end of the cylinder, in some structures. In other structures the annular insert acts directly as a retaining member for the end of a sleeve installed in the cylinder housing, or indirectly through the intermediary of an end cap.

4 Claims, 1 Drawing Sheet

U.S. Patent  Nov. 22, 1988  4,785,721
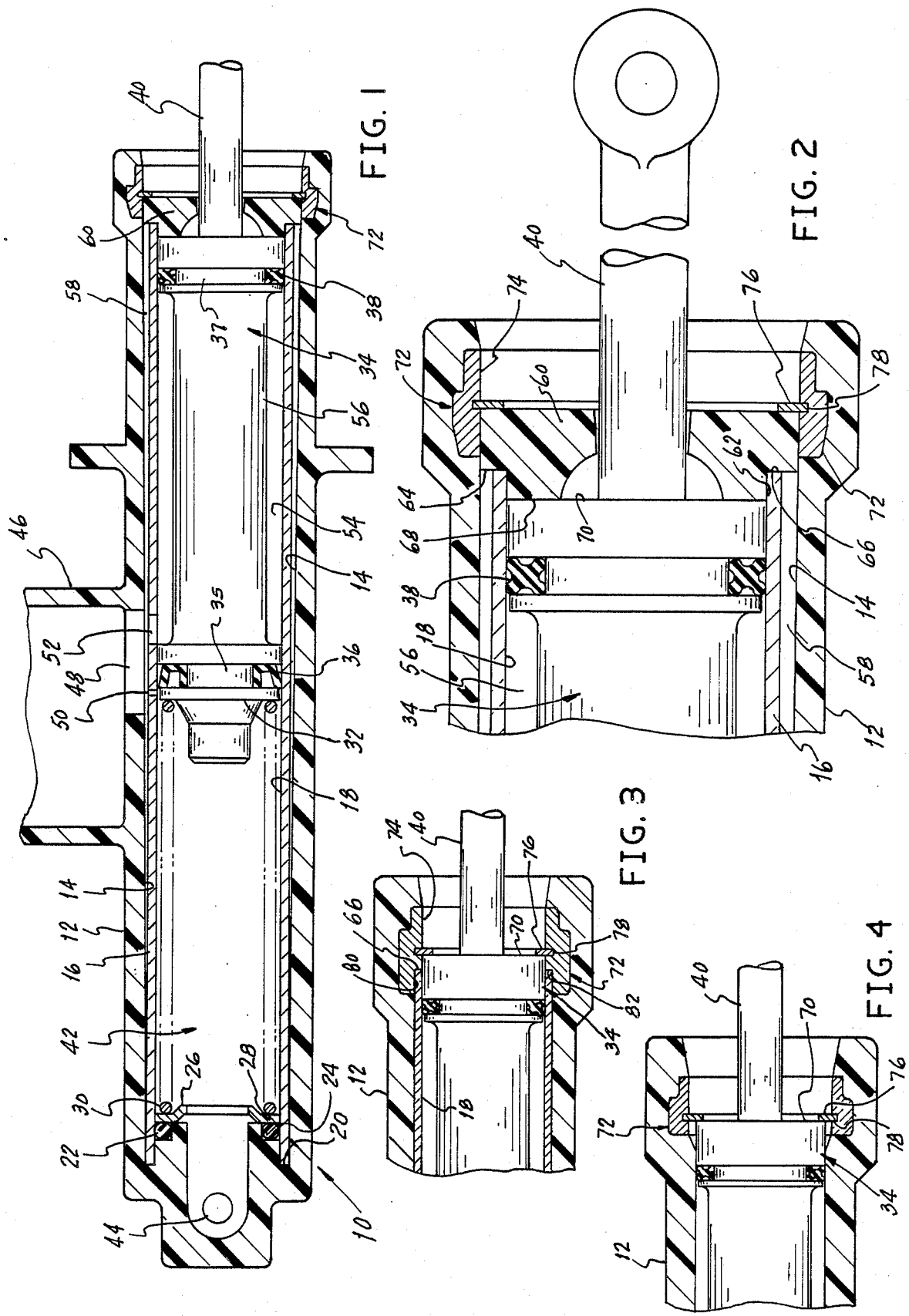

HYDRAULIC CYLINDER ANNULAR INSERT FOR RETAINER MEMBER

CROSS-REFERENCE TO RELATED APPLICATION

The present application is related to application Ser. No. 885,671, now abandoned, filed contemporaneously herewith and assigned to the same assignee as the present application.

BACKGROUND OF THE INVENTION

The present invention relates to hydraulic cylinders in general and more particularly to hydraulic cylinders made of a plastic molding and having a molded-in metallic annular insert. Hydraulic cylinders, such as hydraulic brake master cylinders and master cylinders and slave cylinders for hydraulic apparatus operating motor vehicle mechanical clutches, are sometimes made entirely of an impact and burst resistant plastic molding, but are more commonly made of a housing molded of plastic and provided with an internal tubular member or sleeve defining the bore of the cylinder in which a piston reciprocates.

When molded of plastic, the cylinder housing is generally provided with a bore increasing slightly and progressively in diameter from one end to the other of the bore, because of the molding technique requirement that internal cavities of a molding be provided with at least a small amount of draft to facilitate unmolding. The bore of the plastic housing is subsequently provided with a thin wall metallic sleeve, preferably made of steel, which provides a smooth and substantially cylindrical bore surface, of the same diameter from end to end of the bore, and in which the piston, including the piston seal, is slidably disposed. Such a structure requires that, in addition to providing appropriate sealing from the ambient, more particularly at the pressure end of the cylinder, means be provided for retaining the metallic sleeve in the bore of the plastic housing to prevent longitudinal motion of the sleeve relative to the housing. One end of the sleeve, preferably the pressure end of the sleeve, may be installed in abutment with a portion of the housing, and the other end of the sleeve, at the open end of the cylinder through which the piston rod projects, must be provided with a retainer for holding that end of the sleeve in position and with a second retainer for preventing the piston rear end from being driven out of the cylinder under the action of hydraulic pressure or of the piston return spring. Conventional metallic retainers may be used for that purpose, such as a plain spring split ring engaged in a groove formed in the internal surface of a plastic housing or, in the alternative, such as a split spring ring or wire ring provided with radially extending lugs engaged in slits formed in the internal surface of the housing. An inconvenience in ring/groove assemblies is that the plastic material forming the wall of the groove tends to shear under load or stress and, in the alternative structure consisting of a split ring with lugs engaged in slits in the internal surface of the housing, installing the ring with the lugs engaged in the slits is a difficult and time-consuming operation and forming the slits in the housing results in an expensive mold and in a delicate unmolding operation requiring retractable cores.

SUMMARY OF THE INVENTION

The present invention remedies the inconveniences and shortcomings of the prior art by providing a metallic insert which is molded-in at one end of a plastic cylinder housing and which provides a sturdy and dependable anchoring member for a metallic sleeve, whether substantially installed in the plastic housing or molded in the plastic housing as a result of being installed in the mold prior to injecting the plastic material into the mold. In structures wherein the plastic housing itself is used as a hydraulic cylinder, the invention provides appropriate anchoring means for a retainer preventing the piston from being pushed out of the cylinder at the open end of the cylinder.

These and other objects and advantages of the present invention will become apparent to those skilled in the art when the following description of the present invention is read in conjunction with the accompanying drawing, wherein like numerals refer to like or equivalent parts, and in which:

BRIEF DESCRIPTION OF THE DRAWING

FIG. 1 is a longitudinal section through a hydraulic cylinder provided with a retainer according to the present invention;

FIG. 2 is a view of a portion of the structure of FIG. 1 shown at an enlarged scale; and FIGS. 3 and 4 are modifications of the structure shown at FIG. 2.

DETAILED DESCRIPTION OF THE PREFERRED EMBODIMENTS

Referring to FIG. 1 of the drawings, there is illustrated, in longitudinal section and schematically, an example of hydraulic cylinder 10 such as, for example, the master cylinder of a motor vehicle clutch hydraulic control. The hydraulic cylinder 10 is made of a housing 12 molded of an appropriate material which may be metallic but which, preferably, is a plastic such as ABS, phenolic resin, polyamide, PVC and the like. The plastic molded housing 12 has an internal bore 14 which has a slight taper from one end to the other, the diameter of the housing internal bore 14 being slightly wider at its open end, or right end as oriented in the drawing, than its diameter at its other end. This progressive slight increase in diameter of the housing bore 14 from one end to the other is due to providing draft for facilitating unmolding of the housing 12 from around a mandrel or core, according to conventional casting or molding techniques.

The bore 14 of the housing 12 is lined with a tubular metallic sleeve 16 of constant external and internal diameter from end to end, made, for example, of a length of thin wall seamless steel tubing. The internal surface of the sleeve 16 defines the working bore 18 of the cylinder 10. In the example of structure illustrated one end of the sleeve 16 is inserted in a cylindrical narrow recess 20 formed in the corresponding end of the housing 12 in alignment with the bore 14 of the housing. An elastomeric O-ring 22 is disposed in a stepped annular recess 24. The O-ring 22 is retained in its stepped annular recess 24 by a metallic retainer 26 in the general form of a waster provided with an annular flange 28 compressing the O-ring 22 in the annular recess 24, the retainer 26 being urged in position against the O-ring 22 by one end of the piston return coil spring 30. The other end of the return spring 30 is engaged with a shoulder abutment 32 on the front of the piston 34 reciprocably disposed in the sleeve bore 18.

The piston 34, as is well known in the art of hydraulic master cylinders, has a forward groove 35 in which is disposed an elastomeric cup seal 36 and a rear groove 37 in which is disposed an annular elastomeric quad seal 38. An input member, or push rod, 40 is attached to the rear end of the piston 34, such that when the piston 34 is displaced by the input member 40, to the left as seen at FIG. 1, hydraulic fluid filling the pressure chamber 42 in the sleeve bore 18 between the piston cup seal 36 and the end of the housing 12 is caused to flow from the pressure chamber 42 to a hydraulic utilization device, such as a slave cylinder, not shown, through a port 44 provided with an appropriate connector on the end of a conduit, not shown, connecting the pressure chamber 42 to the working chamber of the utilization device. When the force displacing the piston 34 to the left, as seen in the drawing, is removed from the input member 40, the piston 34 is returned to its home position, shown at FIG. 1, under the double action of the hydraulic fluid being returned from the utilization device to the pressure chamber 42, and the force exerted on the piston by the return spring 30.

The cylinder 10 is provided with an integrally molded reservoir 46 of hydraulic fluid which is placed in communication with the bore 18 of the sleeve 16 via an opening 48 formed in the bottom of the reservoir 46 and a narrow cut-off port 50 which, in the home position of the piston 34, is uncovered by the lip of the cup seal 36. As soon as the piston 34 is displaced to the left a minute distance causing the cup seal 36 to cut off the cut-off port 50, hydraulic fluid in the pressure chamber 42 is displaced by the piston, as previously described. A second port, or recuperation port, 52 is formed through the wall of the sleeve 16, placing the reservoir 46 of hydraulic fluid in fluid communication with an annular space 54 disposed between the bore 18 of the sleeve 16 and a reduced diameter portion 56 of the piston 34 between the piston seals 36 and 38.

Because of the draft taper of the bore 14 of the housing 12, and in view of the fact that the peripheral surface of the sleeve 16 is cylindrical and of the same diameter from end to end, there exists between the peripheral surface of the sleeve 16 and the housing bore 14 an annular space 58 of progressively increasing width from the closed end, except for the hydraulic fluid outlet port 44, of the cylinder 10 to the open end thereof. The sleeve 16 is centered within the housing bore 14 and is held against longitudinal displacement toward the open end of the cylinder by an appropriate end cap 60. The end cap 60, as best shown at FIG. 2, accomplishes the function of centering the sleeve 16 by way of a cylindrical portion 62 of reduced diameter over which the end of the sleeve 16 fits, and accomplishes the function of preventing longitudinal displacement of the sleeve 16 by way of a radially disposed shoulder abutment surface 64 against which the end annular face 66 of the sleeve 16 abuts. The end cap 60 forms an abutment surface 68 against which the end face 70 of the piston 34 abuts in its home, or fully returned, position, and which prevents the piston 34 from escaping from within the bore 18 of the sleeve 16.

In conventional structures, the end cap 60 is retained in position at the end of the housing bore 14 by a conventional spring steel split ring disposed in a groove formed in the surface of the plastic housing bore 14 or, in the alternative, by a spring steel elastic ring having lugs projecting in pockets formed in the surface of the housing bore 14. The inconvenience of the groove split ring structure is that under repeated shocks due to the end face 70 of the piston 34 impacting upon the abutment surface 68 of the end cap 60, the groove in the housing bore 16 tends to widen, the rear sidewall of the groove being repeatedly hammered and the bridge of plastic material between the rear sidewall of the groove and the end of the housing may eventually shear off. The problem associated with the lug-provided spring steel ring is that the pockets for receiving the lugs in the housing bore 14 are difficult to be correctly during molding, and they tend to widen under under repeated shocks due to the impact by the piston upon the end cap abutment surface, and the lugs may bend, or even shear off.

The invention contemplates molding in place at the end of the cylinder housing 12 an annular insert 72 made of strong and impact and stress resistant material, such as steel, having an internal bore 74 of a diameter corresponding generally to that of the housing bore 14 at the end of the housing, FIG. 2. The metallic insert 74 is precisely located around the mandrel or core rod forming the bore 14 of the housing 12 during casting or molding of the housing in an appropriate mold. Once the housing 12 is unmolded, and the mandrel or core rod removed, the annular insert 72 is solidly embedded in the mass of the plastic, or other material, forming the housing 12, and it provides a rigid, strong and dependable anchoring means for a conventional spring steel split ring retainer 76 installed in a groove 78 formed in the bore 74 of the insert 72. The split ring 76 in turn acts as a positioning and retaining means for the end cap 60 which, as previously mentioned, holds the corresponding end of the sleeve 16 centered and against longitudinal displacement and provides an abutment means for the end face 70 of the piston 34 upon return to its home position.

Because the hydraulic fluid in the annular space 58 between the peripheral surface of the sleeve 16 and the surface of the bore 14 in the housing 12 is normally only under atmospheric pressure, as is the hydraulic fluid filling the annular space 54 around the reduced diameter portion 56 of the piston 34 introduced through the recuperation port 52, there is generally no requirement for sealing means to be provided at the end of the annular space 58, more particularly if the end cap 60 has a tight fit into the end of the housing bore 14. Preferably, however, an O-ring not shown, may be placed in an appropriate peripheral groove in the end cap 60.

In application Ser. No. 885,671, now abandoned, assigned to the same assignee as the present application and filed contemporaneously herewith, there is disclosed a structure for hydraulic cylinders which copmrises molding a housing around a metallic sleeve or liner. The metallic sleeve or liner is provided at its end corresponding to the pressure end of the cylinder with an outwardly directed annular offset resulting in interlocking the metallic sleeve or liner at that end into the mass of material of the housing, such as to prevent longitudinal displacement of the sleeve or liner relative to the housing. The present invention provides, as shown schematically at FIG. 3, means for holding a cylinder sleeve or liner 16 solidly in position against longitudinal displacement in a plastic housing 12, for example, molded directly around the sleeve or liner 16, by disposing an appropriate annular insert 72 at and over the end of the sleeve or liner 16. The insert 72 has a bore 74, corresponding in diameter to the bore 18 of the sleeve or liner 16, which is enlarged, as shown at 80, for accepting the outer diameter of the sleeve or liner 16 proximate its end face 66 which abuts a radially disposed annular shoulder 82 joining the bore 74 of the insert 72 and its portion 80 of enlarged diameter. An elastic spring steel split ring 76 is disposed in the groove 78 formed in the bore 74 in the insert 72. The split ring 76 functions as an abutment for the end face 70 of the piston 34 when the piston 34 is returned to its home position.

As schematically illustrated at FIG. 4, the metallic annular retainer 72 of the invention also has application in hydraulic cylinders molded of plastic or other material, and having no sleeve lining the bore of the housing 12. The insert 72 is molded or cast in position within the mass of the material of the housing 12 when the latter is molded or cast, and the steel spring elastic split ring 76 engaged in the internal groove 78 of the insert 72 functions as the retaining and abutment means for the piston 34 when returned to its home position.

Having thus described the invention by way of structural examples thereof, modifications whereof will be apparent to those skilled in the art, what is claimed as new is as follows:

1. In an hydraulic cylinder assembly of the type including a cylinder having a closed forward end and an open rearward end for passage of a pushrod, means defining a working bore within said cylinder extending axially from a location adjacent the closed end thereof to a location adjacent the open end thereof, and a piston mounted for reciprocal axial movement in the working bore, the improvement wherein said cylinder is formed of a non-metallic material; and annular metallic insert having an axial length less than the axial length of said piston is molded as a solid continuous closed ring in the internal bore of the cylinder and is positioned within said cylinder bore adjacent but totally forwardly of the open rearward end of said cylinder and proximate the rearward end of said working bore during the molding of said cylinder; said insert has an internal continuous annular groove positioned rearwardly of the rearward end of said working bore; and an elastic spring steel ring is disposed in said groove for forming an abutment preventing said piston being pushed rearwardly from the open rearward end of said cylinder.

2. The improvement of claim 1 wherein said cylinder comprises a molded plastic housing and the internal bore of said insert is generally flush with the internal bore of said housing.

3. In an hydraulic cylinder assembly of the type including a cylinder having a closed forward end and an open rearward end for passage of a pushrod, means defining a working bore within said cylinder extending from a location adjacent the closed end thereof to a location adjacent the open end thereof, and a piston mounted for reciprocal movement in the working bore, the improvement wherein said cylinder is formed of a non-metallic material; an annular metallic insert is molded as a solid continuous closed ring in the internal bore of the cylinder adjacent but forward of the open rearward end of said cylinder and proximate the rearward end of said working bore during the molding of said cylinder; said insert has an internal continuous annular groove positioned rearwardly of the rearward end of said working bore; and an elastic spring steel split ring is disposed in said groove for forming an abutment preventing said piston being pushed rearwardly from the open rearward end of said cylinder; said cylinder comprising a molded plastic housing and the internal bore of said insert being generally flush with the internal bore of said housing; said housing being molded around a metallic sleeve; said sleeve defining said working bore; said insert including a portion of enlarging diameter at one end of said insert; said portion of enlarged diameter being disposed around the periphery of said sleeve and defining a radially disposed shoulder abutment for engagement with the rearward end of said sleeve.

4. In an hydraulic cylinder assembly of the type including a cylinder having a closed forward end and an open rearward end for passage of a pushrod, means defning a working bore within said cylinder extending from a location adjacent the closed end thereof to a location adjacent the open end thereof, and a piston mounted for reciprocal movement in the working bore, the improvement wherein said cylinder is formed of a non-metallic material; an annular metallic insert is molded as a solid continuous closed ring in the internal bore of the cylinder adjacent but forward of the open rearward end of said cylinder and proximate the rearward end of said working bore during the molding of said cylinder; said insert has an internal continuous annular groove positioned rearwardly of the rearward end of said working bore; and an elastic spring steel spring ring is disposed in said groove for forming an abutment preventing said piston being pushed rearwardly from the open rearward end of said cylinder; said cylinder comprising a molded plastic housing and the internal bore of said insert being generally flush with the internal bore of said housing; a metallic sleeve being installed in said housing and defining said working bore; and said cylinder assembly further comprising an end cap on the end of said sleeve adjacent said open end of said housing, said end cap providing centering of said sleeve and abutment means preventing longitudinal displacement of said sleeve relative to said housing, said end cap having an abutment surface for engagement with the end of the piston, and being held in position within said insert between said end of said sleeve and said split ring.

* * * * *